Oct. 26, 1965    R. V. VIGERHED    3,213,508
SAFETY DEVICE IN LOAD HOOKS
Filed Sept. 26, 1963    2 Sheets-Sheet 1

*INVENTOR*
Rolf Vigelius Vigerhed

*by* Sparrow and Sparrow
ATTORNEYS.

INVENTOR.
Rolf Vigelius Vigerhed by Sparrow and Sparrow
ATTORNEYS.

United States Patent Office 3,213,508
Patented Oct. 26, 1965

3,213,508
SAFETY DEVICE IN LOAD HOOKS
Rolf Vigelius Vigerhed, Avagen 4, Lane-
Herrestad, Sweden
Filed Sept. 26, 1963, Ser. No. 311,862
Claims priority, application Sweden, Aug. 12, 1963,
8,781/63
3 Claims. (Cl. 24—241)

The present invention relates to safety devices in load hooks, more particularly to such a device for preventing a rope or strap received in the hook from accidentally sliding off the hook, especially when the rope is slackening. Contrary to previously known safety devices of this kind the device according to the invention has a double function, as it also prevents the rope from hooking on to the hook from the outside, e.g. in a slackening, twisting condition, a mishap which also may cause trouble and risks.

It is the general object of this invention to provide a new and improved safety device on load hooks or the like.

Furthermore, it is an object of the invention to provide for contrivances on load hooks by which ropes will be prevented from slipping off due to twisting movements thereof in instances of intermittent slacking, before they are securely located on the hook.

Another object of this invention is to provide a new and efficient safety device on load hooks which is of simple, sturdy, reliable structure.

Yet another object of the present invention is to provide an article of manufacture of the kind described which is easy to handle and inexpensive to manufacture.

Further objects and advantages of the present invention will become clearly apparent from the detailed description given below taken in connection with the accompanying drawing which forms part of this specification and illustrates merely by way of example one embodiment of the device of the invention.

Figure 1:
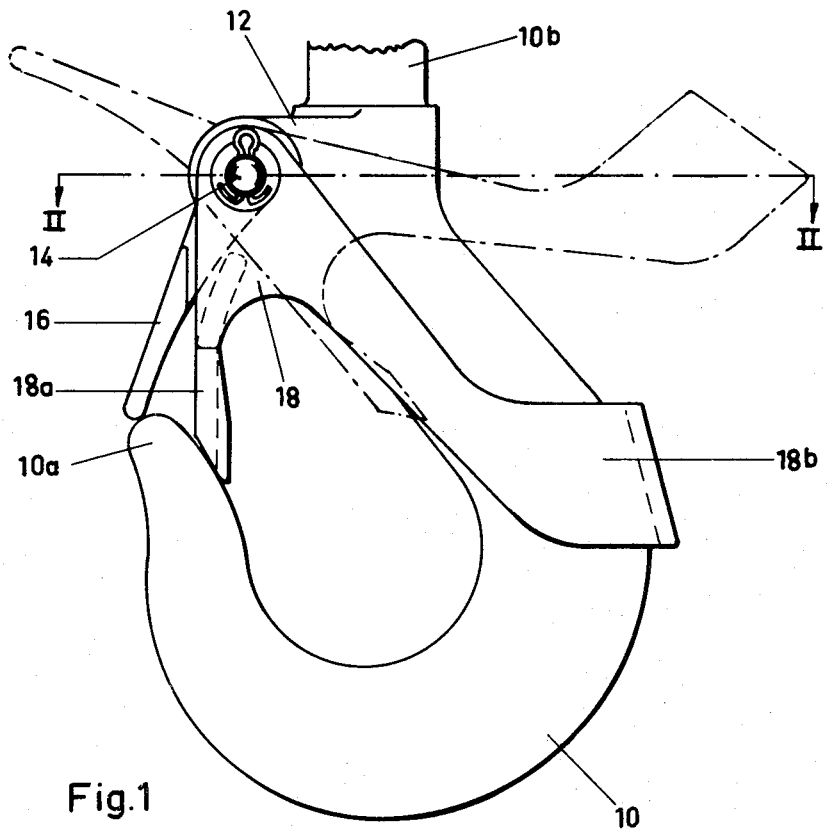
FIG. 1 shows a side elevation of a safety device according to the invention.
Figure 2:
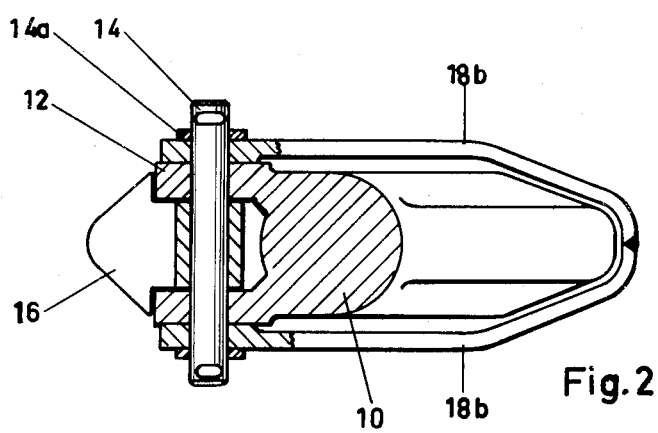
FIG. 2 is across section on line II—II in FIG. 1.

In the embodiment of the invention shown in FIGS. 1 and 2 a load hook 10, being of a conventional construction per se (e.g. according to standard), is provided with welded, forged, or otherwise applied lugs or brackets 12 which are located on the neck of the hook and project above the entrance opening of the hook. Between the lugs a through shaft or bolt 14 extends upon which one outer and one inner latch member 16 and 18, respectively, are mounted freely pivotable. The outer latch member 16 is formed as a tapering plate whose tip normally rests on the outside of the tip 10a of the load hook. In the embodiment shown the latch plate 16 is carried between the lugs 12 and rests on the tip of the hook by gravity. However, it may also be spring loaded. The inner latch member 18 comprises a bell crank whose one arm portion comprises a plate 18a welded or otherwise secured to the other arm portion, which comprises two legs 18b arranged on either side of the hook. The latch plate 18a tapers towards its free end which normally engages the inside of the tip 10a of the hook, the plate being maintained into abutment by the weight of the legs 18b which tend to pivot the whole detent member 18 clockwise, as viewed in FIG. 1, about the shaft 14. In this case the latch member 18 is suitably carried on the outside of lugs 12, the shaft 14 being received in holes in the lugs 18b and secured against axial displacement by means of split pins and washers 14a on the outside of the legs. As a matter of course also a bolt with nut, a pin with clips or the like may be used as a mount for the latch members. Furthermore, the complete bell crank 18 may be made in one piece.

The safety device operates in the following way. As shown in FIG. 1 a cable or rope resting in the hook will be caught and confined by the arm 18a of the inner latch and cannot slide off. But neither can a rope twisting or struggling outside the hook accidently be hooked on to the hook as it will be rejected by the outer latch 16. In order to unhook the rope the legs 18b of the inner latch is raised, which can be carried out from any side of the hook, the arm 18a being brought to the position shown by broken lines in FIG. 1 and the rope may be unhooked as it moves away from the outer latch 16 which pivots outwardly. Conversely, when hooking on the rope the latch 16 is raised to the position shown with broken lines and when the rope is then moved in it will automatically push away the latch arm 18a.

Figure 3:
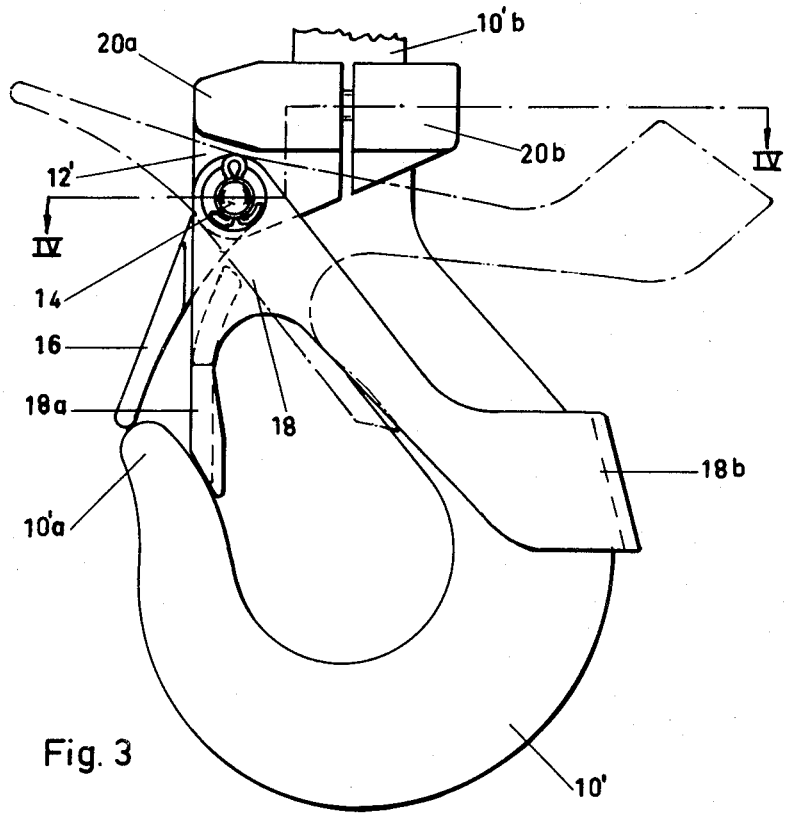
FIG. 3 is a side elevation of a modified embodiment of the invention.
Figure 4:
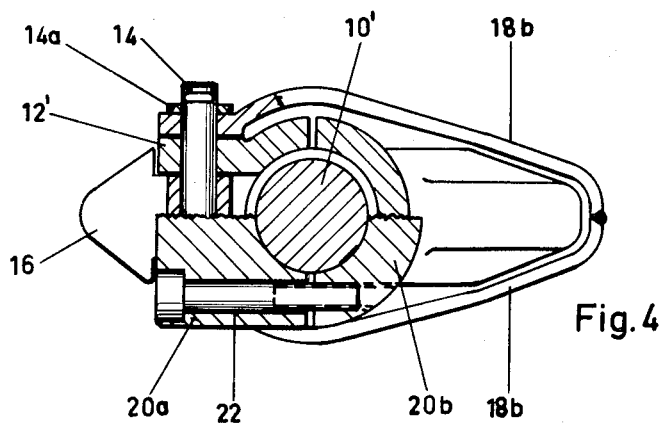
FIG. 4 is a cross section on line IV—IV in FIG. 3.

In FIGS. 3 and 4 the safety device according to the invention is shown constructed as a separate unit or an accessory which may be mounted on an ordinary standard type load hook 10'. In this case the lugs 12' carrying the latch members are formed on the front half 20a of a split ring 20a, b, which is clamped to the neck of the hook by means of screws 22. The outer and inner latch members 16 and 18, respectively, are substantially identical with those shown in FIGS. 1 and 2 and the device operates in the same manner as described above.

As a matter of course, it is understood that a plurality of embodiments are possible within the scope of the invention and the double acting safety device according to the invention is in no way limited to the constructions here shown by way of example. The essence of the invention resides in the double, outer and inner latch members complimentary to one another and it is obvious that there are an unlimited number of solutions of the practical problem of their mechanical construction.

What I claim is:

1. A safety device for load hooks having a bent portion extending from a shank, said bent portion ending in a tip said tip being spaced from and extending substantially parallel to a portion of the shank, said device securing a rope, strap or the like hanging in said hook against involuntary unhooking, comprising: a horizontally arranged shaft on said shank, a first latch member pivotally mounted on said shaft, a second latch member pivotally mounted on said shaft independent of said first member, said members closing the opening between said tip and said shank for confining in the rest positions of said members said rope in said hook, said first latch member having the shape of a bell crank having two arms, one arm thereof closing said opening from within said hook, engaging the inner side of said tip, the other arm constituting a handle serving as a counterweight, said other arm extending outside along the portion of said hook opposite said tip and said second latch member having the shape of a plain link closing said opening from the outside of said hook, engaging by the free end thereof the oustide of said tip, said second latch member being adapted to freely let said rope, strap or the like pass from inside of the hook to outside of the hook but to block passage thereof in the opposite direction, said first latch member being adapted to freely let said rope, strap or the like pass from outside of the hook to inside of the hook but to block passage thereof in the opposite direction, said latch members being manually withdrawable from their rest positions and being held in said rest positions by gravity only.

2. A safety device according to claim 1, and having brackets extending from said shank, said brackets carrying said shaft and said latch members on said shaft.

3. A safety device according to claim 1, and having a clamping device on said shank, said clamping device being made of a split ring clamped on said shank, said clamping device carrying said shaft and said latch members on said shaft.

References Cited by the Examiner

UNITED STATES PATENTS

| | | | |
|---|---|---|---|
| 797,941 | 8/05 | Corbett | 24—241 |
| 1,677,592 | 7/28 | Lloyd | 24—233 |
| 1,711,346 | 4/29 | Greve | 24—241 |
| 1,716,997 | 6/29 | Antoniow | 24—241 |
| 1,914,189 | 6/33 | Yingling | 24—241 |
| 3,038,753 | 6/62 | Seager | 24—241 |

ALBERT H. KAMPE, *Primary Examiner.*

DONLEY J. STOCKING, BOBBY R. GAY, *Examiners.*